United States Patent [19]
Enabnit

[11] 3,831,161
[45] Aug. 20, 1974

[54] FAIL-SAFE MONITORING APPARATUS

[75] Inventor: Robert S. Enabnit, Akron, Ohio

[73] Assignee: The Goodyear Tire & Rubber Company, Akron, Ohio

[22] Filed: June 8, 1972

[21] Appl. No.: 260,935

[52] U.S. Cl............... 340/259, 73/146.5, 226/11, 330/1 R, 340/58
[51] Int. Cl.................... B65h 25/30, B60c 23/00
[58] Field of Search............ 340/259, 58; 73/146.5; 226/11; 331/65; 330/1 R

[56] References Cited
UNITED STATES PATENTS
| | | | |
|---|---|---|---|
| 3,614,732 | 10/1971 | Lejeune | 331/65 |
| 3,636,436 | 1/1972 | Kurauchi et al. | 340/259 |
| 3,656,137 | 4/1972 | Ratz | 340/259 |
| 3,662,335 | 5/1972 | Fritze | 73/146.5 |
| 3,742,477 | 6/1973 | Enabnit | 340/259 |

*Primary Examiner*—Glen R. Swann, III
*Attorney, Agent, or Firm*—F. W. Brunner; L. A. Germain

[57] ABSTRACT

An amplifier oscillates when a moving close-circuited inductor increases the coupling between a pair of input and output inductors. The oscillatory bursts, due to the periodic and proximate passage of the moving inductor, are integrated and averaged to provide a voltage level sufficient to maintain a warning circuit in a "safe operating" condition indication. The absence or open-circuiting of the moving inductor drops the voltage to a level such that the warning circuit provides an "abnormal operating" condition indication.

11 Claims, 6 Drawing Figures

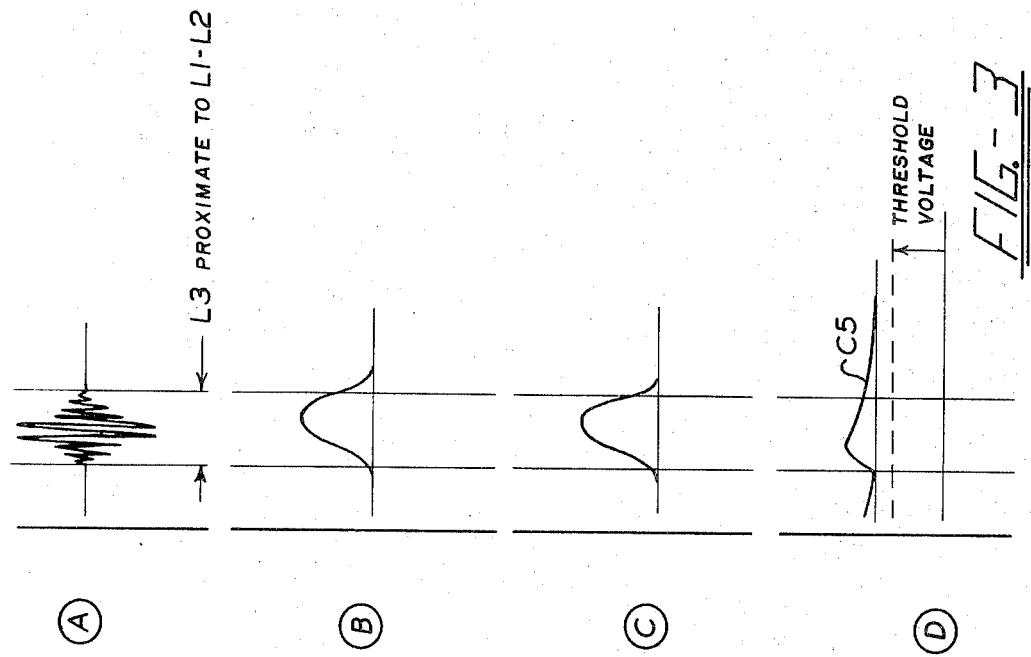
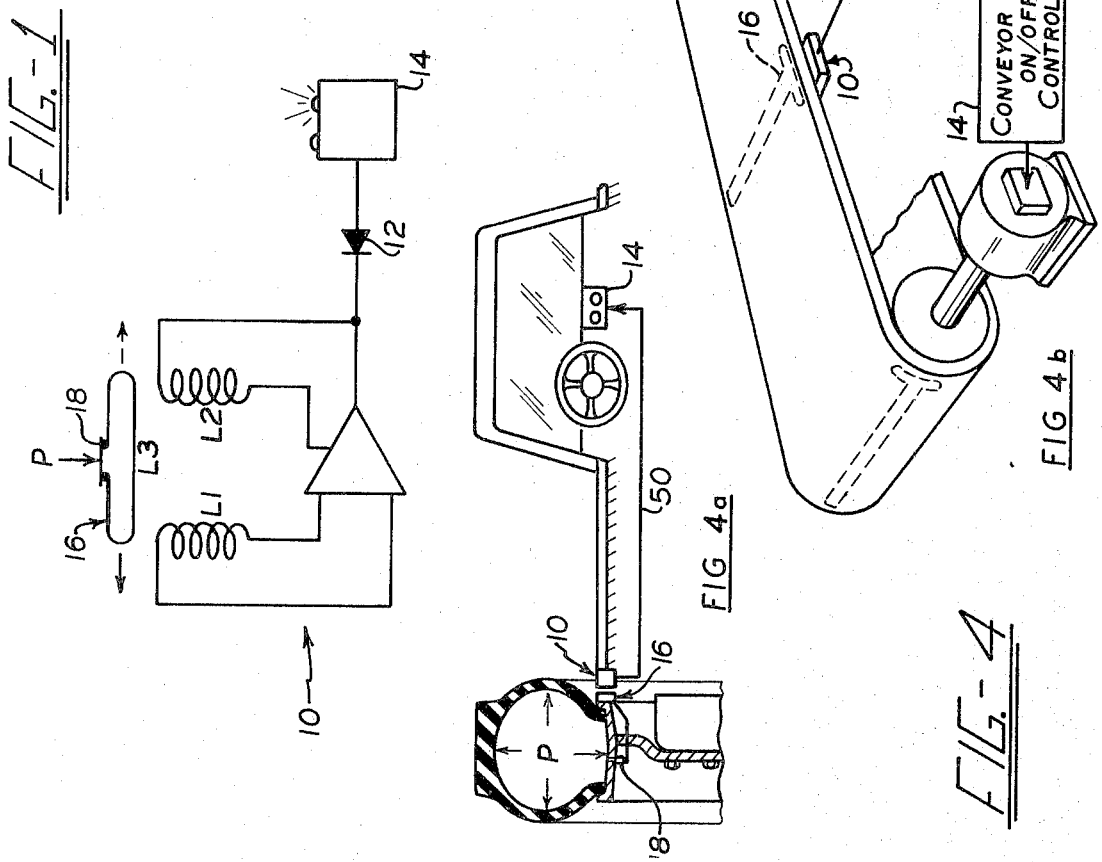

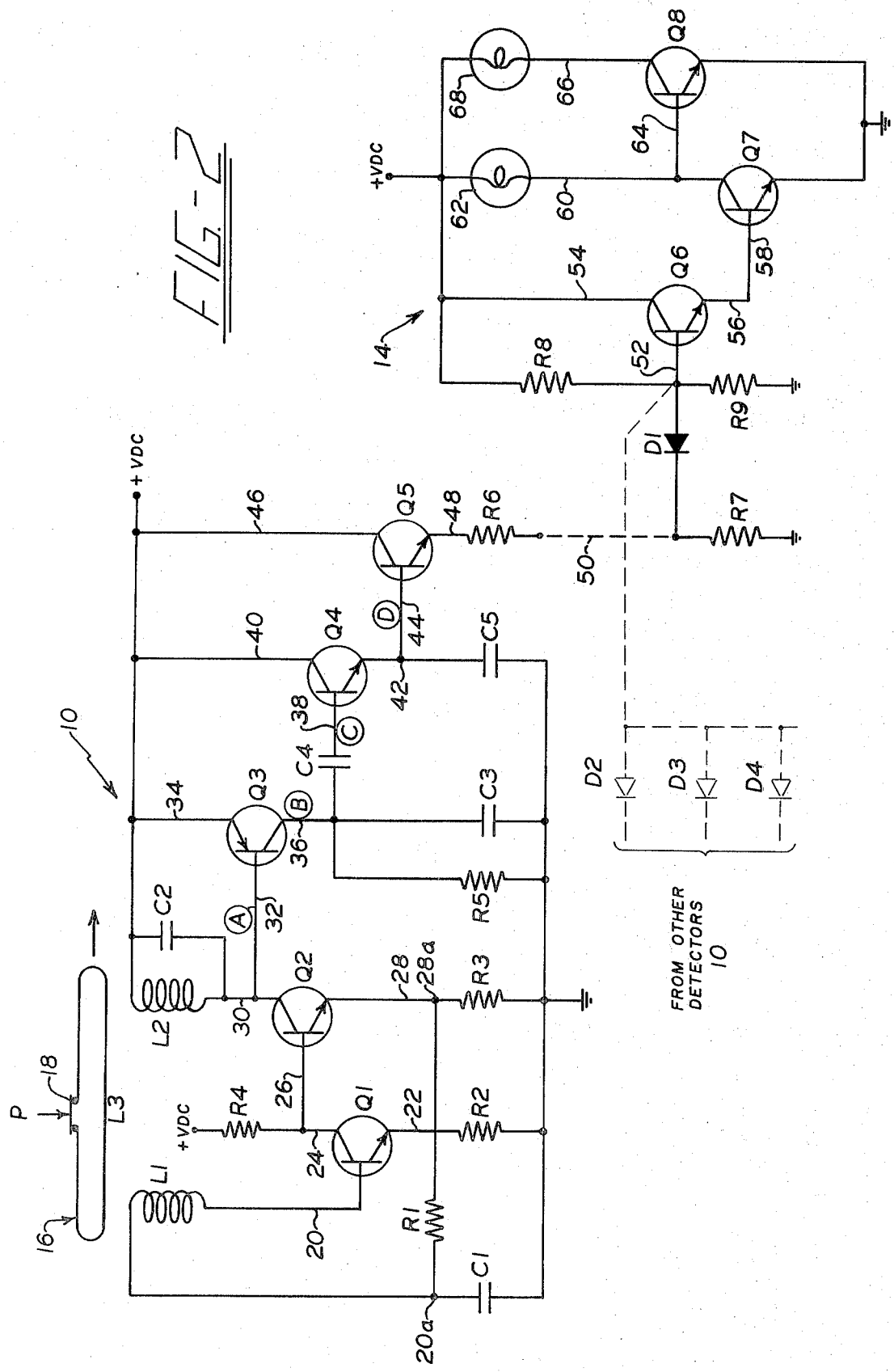

FAIL-SAFE MONITORING APPARATUS

BACKGROUND OF THE INVENTION

The invention generally relates to apparatus for indicating the presence of an abnormal condition and more specifically to apparatus for monitoring the condition between two elements in relative motion. There are many instances wherein the condition of a moving member must be known at all times to maintain the system in a safe operating condition. The system must be "fail-safe" and of a type to monitor the condition of both the monitored member and the monitoring apparatus. One application where this is necessary may be in conveyor systems where it is important in the event of a break or tear in the conveyor belt to shut down the system before extensive damage occurs. Another application may be in monitoring vehicle tire pressure wherein the operator is warned of an abnormal or unsafe condition of one or more of the tires. Various other applications of this invention will become apparent to persons skilled in the art, however, for the purpose of conciseness, the invention will only be described with respect to the before-mentioned applications.

SUMMARY OF THE INVENTION

Known prior art devices used to monitor a condition on a moving element suffer from one or more of the following deficiencies:

1. they are complicated to the point of being uneconomical to manufacture;
2. they are not easily implemented to the specific application requiring complicated mounting arrangements because of critical relative spacing requirements of the transmitting and receiving components;
3. they are not "fail-safe" to the point of indicating a malfunction of both monitored element and monitoring apparatus; and
4. they are affected by environmental influences and require regular maintenance.

Therefore, it is a primary object of this invention to provide a fail-safe condition monitoring apparatus that suffers least from the aforementioned and other deficiencies of the prior art devices.

The primary object and other objects and advantages of the invention will become apparent in the following description of one embodiment comprising condition-sensing means on a movable member, circuit means on a relative stationary member responsive to the condition-sensing means to provide an output electrical signal representative of the state or condition sensed on the movable member, and indicating means on the stationary member to provide a warning signal representative of the condition sensed on a moving member.

DESCRIPTION OF THE DRAWINGS

The features and advantages of the invention will be better understood from a consideration of the following description taken in conjunction with the accompanying drawings in which:

FIG. 1 diagrammatically illustrates the principle of the invention;

FIG. 2 is a circuit diagram of the preferred embodiment;

FIG. 3 illustrates the signal wave forms at respective points in the circuit of FIG. 2; and FIG. 4 illustrates the application of the invention to a vehicle tire pressure monitoring system (FIG. 4a) and to a conveyor belt rip monitoring system (FIG. 4b).

DETAILED DESCRIPTION OF THE PREFERRED EMBODIMENTS

Referring to FIG. 1, a detector circuit generally indicated at 10 comprises an amplifier having an input inductor L1 and an output inductor L2. The output of the circuit 10 is coupled through a diode 12 to a warning indicator circuit 14, that by virtue of the amplifier configuration and arrangement with a relative moving circuit 16, provides an indication of the state or condition of the circuit 16 and/or the condition of the monitoring circuit 10.

The circuit 16 comprises a switch 18 that functions to sense a predetermined condition of the movable member and an inductor loop L3 that provides increased mutual coupling of the inductors L1 and L2 according to its relative motion past the inductors L1 and L2. The inductors L1 and L2 are considered normally uncoupled as insufficient coupling exists to affect the state of the amplifier in the absence of a closed circuit 16.

The invention contemplates that, in its best mode of operation, circuit 16 is maintained close-circuited in the absence of an abnormal condition of the monitored member. In this circumstance, L1 and L2 will become mutually coupled upon proximate passage of L3 and the detector 10 will function to operate on the signal generated due to the coupled inductors L1 and L2.

A warning indicator circuit 14 is coupled to the detector circuit to provide an indication of both the normal and abnormal condition of the monitored member and the monitoring apparatus as will be more fully explained with respect to FIG. 2.

Referring to FIG. 2, the detector circuit 10 comprises NPN-type transistors Q1 and Q2 having base, emitter, and collector electrodes. The base lead 20 of transistor Q1 is connected to ground potential through inductor L1 and capacitor C1 while its emitter 22 is connected to ground through resistor R2. The collector lead 24 of Q1 is connected to a source of positive D.C. voltage through biasing resistor R4. Transistor Q2 has its base lead 26 connected to the output collector lead 24 of Q1 while its emitter lead 28 is ground connected through resistor R3. Transistor Q2 has its collector lead 30 connected to the source of positive battery voltage through a tank circuit comprising an inductor L2 and a capacitor C2. This D.C. amplifier configuration is stabilized through resistor R1 connected between the input at 20a and the emitter lead 28 of Q2 at node 28a with degeneration provided through the respective emitter resistors R2 and R3.

Connected to the output of the amplifier at 30 is a circuit comprising transistors Q3, Q4, and Q5 having base, emitter, and collector electrodes. Transistor Q3 is a PNP-type transistor having its base lead 32 connected to the output collector lead 30 of transistor Q2 while its emitter lead 34 is connected to the source positive D.C. voltage. The collector lead 36 of Q3 is connected to ground through a parallel RC circuit comprising resistor R5 and capacitor C3, and is also connected to the base lead 38 of transistor Q4 through a coupling capacitor C4.

Transistor Q4 is in a common emitter configuration having its collector lead 40 connected to the source of positive D.C. voltage and its emitter 42 connected to ground through a capacitor C5. Transistor Q5 is a voltage follower having its base lead 44 connected to the emitter lead 42 of Q4. The collector lead 46 of Q5 is connected to the source of positive D.C. voltage while the emitter provides output current through resistor R6 and a remote ground return circuit.

The output of the detector circuit 10 is fed to an indicator circuit 14 via line 50 shown as a dashed line in FIG. 2 to illustrate its remote location with respect to the detector circuit 10. The indicator circuit comprises NPN-transistors Q6, Q7, and Q8. At the input, current through resistor R7 establishes the voltage level for conduction or non-conduction of diode D1. Transistor Q6 has its base lead 52 connected to a base bias circuit comprising resistors R8 and R9 and the diode D1. Transistor Q6 is appropriately biased to conduct having its collector lead 54 connected to the source of positive D.C. voltage. Transistors Q6 and Q7 are connected in a Darlington configuration, the emitter 56 of Q6 coupled to the base 58 of Q7. The collector lead of Q7 is connected through an indicator lamp 62 to the source of positive D.C. voltage. Coupled to the collector of Q7 is the base lead 64 of Q8 which also has its collector lead 66 connected through an indicator lamp 68 and to the source of positive D.C. voltage.

In operation, the detector circuit 10 is mounted on the stationary member such that inductors L1 and L2 are in relative position to inductor L3 mounted on the movable member.

In the application of the invention to a vehicle tire pressure monitoring system as illustrated in FIG. 4a, a sensor circuit 16 comprising inductor L3 and a switch 18 is mounted on each vehicle wheel and the switch 18 is a pressure switch maintained in a closed position by proper tire pressure P. The detector circuit 10 comprising inductors L1 and L2 is mounted on the vehicle chassis in relative position to the rotating inductor L3 such that the proximate passage of L3 upon each rotation of the wheel substantially increases the coupling between L1 and L2 such that a signal is generated that is fed via line 50 to the warning circuit 14 mounted in the vehicle cab to provide an indication to the operator of the state of each tire on the vehicle.

In the application of the invention to a conveyor belt monitoring system as illustrated in FIG. 4b, L3 is embedded in the belt transverse to the longitudinal directional movement of the belt and across the full width thereof. In this case, switch 18 is not necessary and L3 is a close-circuited loop that becomes open-circuited upon occurrence of a longitudinal tear or tip in the belt. A number of loops L3 are disposed in the belt at regular spaced apart intervals throughout the length of the belt such that the time interval between successive loops is shorter than the time constant of the detector circuit 10, as will hereinafter be more clearly described with respect to FIGS. 2 and 3. Further, with reference to FIG. 4b, the warning or indicator circuit 14 is coupled to an on/off controller to automatically shut down the conveyor in the event of a tear in the belt. In the case of a very long conveyor, such as used in mining operations, a number of detector circuits 10 may be mounted at regular locations along the length of the belt to facilitate early detection of a tear in the belt.

Further, and more specifically to the circuit operation and with reference to FIG. 2, Q1 and Q2 comprise a D.C. amplifier with D.C. stabilization provided through resistor R1 and degeneration through resistors R2 and R3 while A.C. feedback is prevented due to capacitor C1. The amplifier also provides an input inductor L1 and an output inductor L2 with insufficient mutual coupling between them to cause the amplifier to oscillate. Upon passage of close-circuited inductor L3 in proximate aligned position to L1 and L2, coupling between L1 and L2 is increased to an extent that oscillation occurs in a burst as illustrated in waveform A of FIG. 3. The oscillatory burst is outputed on line 32 and while Q2 conducts, Q3 conducts and capacitor C3 is charged positively. Discharge of C3 occurs through resistor R5 and is slow enough to follow only the modulation of the burst signal. Capacitor C4 passes the modulation pulse but not the D.C. level and this pulse biases Q4 to draw current charging capacitor C5 whose time constant maintains a positive level between pulses. The waveforms for points B, C, and D in the circuit are illustrated in FIG. 3.

It should be clear from the foregoing, that as long as the movable sensor circuit 16 provides a close-circuited inductive loop L3 that periodically couples inductors L1 and L2, then a modulation pulse will be provided to maintain capacitor C5 in a positively charged condition.

With capacitor C5 charged, Q5 is conducting and diode D1 is reverse biased. In this condition, Q6 and Q7 are conducting and indicator lamp 62 is "on." The lamp 62 may be a small green panel lamp and as long as the lamp is "on," the operator is readily advised that the monitored member is operating normally. When, however, circuit 16 becomes open-circuited due to an abnormal condition, no modulation pulse is provided to maintain the charge on C5 and transistor Q5 is "cut-off." Diode D1 becomes forward-biased and transistors Q6 and Q7 are switched into non-conducting states. In this circumstance, Q8 is switched into conduction and lamp 68 is turned "on" while lamp 62 is turned "off." Lamp 68 may be a red panel lamp to readily warn an operator of an abnormal condition existing on the movable member, or it may be any other type of visual or audible device to meet the needs of the particular application.

It should become apparent from the foregoing description that an abnormal condition which open circuits the sensor circuit 16 will cause the capacitor C5 to discharge below the predetermined threshold indicated in FIG. 3 by waveform "D" and to switch the state of the indicator circuit 14 from a "normal condition" indication to an "abnormal condition" indication. It should also become apparent that any malfunction of the detector circuit 10 that allows C5 to discharge or an open circuit in line 50 will also provide an "abnormal condition" indication to the operator. In this respect, the apparatus of this invention is considered "fail-safe" as it provides an indication of both normal and abnormal operating conditions of both the monitored member and the monitoring circuit.

The circuitry of the invention is adaptable to miniaturization by printed circuit techniques and encapsulation and, therefore, lends itself well to the harsh environments found in both automotive and industrial conveyor applications. In either of these or other applications, while only a single warning indicator circuit 14 may be utilized to provide a malfunction signal as illustrated in FIG. 2 where multiple inputs shown in dashed line portions feed a single indicator 14, the miniaturized circuitry takes up so little space that any number of indicators 14 may be used in conjunction with sensors 16 and detectors 10 to more specifically locate a particular point of malfunctioning. This would be true in the case of multi-wheeled vehicles where it would be beneficial to exactly pinpoint the particular tire having low pressure, or in the case of an exceptionally long endless-belt-conveyor wherein it would be beneficial to monitor the belt at various locations along its length for early "shut-down" in the event of a rip in the belt.

While only a single representative embodiment of the invention has been shown and described as it applies to two particular applications, it will become apparent to those skilled in the art that various changes and modifications may be made therein without departing from the spirit or scope of the invention as covered by the appended claims. For example, the apparatus will work as well if it is deemed necessary to maintain circuit 16 open-circuited under normal operating conditions. In this circumstance, capacitor C5 will remain discharged and all that is necessary is to reverse the warning indicator lamps 62 and 68. An occurrence of an abnormal condition will close the circuit 16 and a modulation pulse will be provided to charge C5 above the threshold and the indicator circuit 14 will be switched to its opposite state. This is all within the knowledge of persons skilled in the art and, therefore, the scope of the invention is considered limited only by the scope of the appended claims.

What is claimed is:

1. Apparatus for monitoring the condition of a first member proximate and in relative motion to a second member comprising:
   A. detector circuit means on the second member comprising an amplifier having input and output inductors with insufficient mutual coupling to provide positive feedback in the amplifier, said circuit means providing an output signal in response to coupling of the amplifier input and output inductors;
   B. sensor circuit means on the first member to monitor the condition of the first member and to provide periodic coupling between the amplifier inductors when close-circuited in response to the monitored condition; and
   C. indicator circuit means responsive to and accepting the output signal of the detector circuit means to provide an indication representative of the condition monitored by the sensor circuit means.

2. The apparatus of claim 1 wherein the sensor circuit means comprises a normally closed-circuited inductor that provides coupling between the amplifier input and output inductors sufficient to cause the amplifier to oscillate when said inductor is in proximate position to the amplifier inductors, said sensor circuit means adapted to be open-circuited upon the occurrence of an abnormal condition.

3. The apparatus of claim 2 wherein the detector circuit means further comprises:
   a. means to demodulate the amplifier output signal to provide a pulse signal; and
   b. means to sum the pulses to provide a first D.C. voltage to the indicator circuit means input representative of a close-circuited sensor circuit and to provide a second D.C. voltage representative of an open-circuited sensor circuit.

4. The apparatus of claim 3 wherein the indicator circuit means is responsive to the D.C. voltage at its input to provide a normal condition indication when the voltage is above a predetermined level and to provide an abnormal condition indication when the voltage is below the predetermined level.

5. The apparatus of claim 1 wherein the sensor circuit means comprises a normally open-circuited inductor adapted to be close-circuited upon the occurrence of an abnormal condition, said means providing coupling between the amplifier inductors sufficient to cause the amplifier to oscillate when close-circuited and in proximate position to said amplifier inductors.

6. The apparatus to claim 5 wherein the detector circuit means further comprises:
   a. means to demodulate the amplifier output signal to provide a pulse signal; and
   b. means to sum the pulses to provide a first D.C. voltage to the indicator circuit means input representative of an open-circuited sensor circuit and to provide a second D.C. voltage representative of a close-circuited sensor circuit.

7. The apparatus of claim 6 wherein the indicator circuit means is responsive to the D.C. voltage at its input to provide a normal condition indication when the voltage is below a predetermined level and to provide an abnormal condition indication when the voltage is above the predetermined level.

8. Apparatus for monitoring a condition on a first member proximate and in relative motion with respect to a second member comprising:
   A. an indicator circuit on the second member adapted to indicate normal and abnormal condition occurrences in response to the voltage level at its input;
   B. a close-circuited inductor on the first member adapted to be open-circuited upon the occurrence of an abnormal condition; and
   C. a detector circuit on the second member coupled to provide an input signal to the indicator circuit, said detector circuit comprising:
      a. an amplifier having uncoupled input and output inductors in proximate relative position to the close-circuited inductor on the first member, said amplifier adapted to provide an oscillatory output signal when the input and output inductors are coupled by the proximate position of the inductor on the first member;
      b. means to demodulate the oscillatory output of the amplifier to provide a pulse for each amplifier output; and
      c. means to sum the pulses from the demodulating means to provide a first signal voltage level to the indicator circuit in response to a close-circuited inductor on the first member and a second signal voltage level in response to an open-circuited inductor on the first member.

9. Apparatus according to claim 8 wherein the first member is a vehicle wheel and a pressure switch is adapted to maintain the inductor circuit closed under normal tire pressure.

10. Apparatus according to claim 8 wherein the first member is a conveyor belt, and said close-circuited inductor is embedded in the belt along its width and transverse to the direction of movement of the belt and adapted to being open-circuited upon a longitudinal break in the belt.

11. Apparatus according to claim 8, wherein the first member is a conveyor belt and a plurality of said close-circuited inductors are positioned at regular intervals along the length of the belt and embedded in the belt, along its width and transverse to the direction of movement of the belt to provide periodic coupling of the amplifier input and output inductors, said means to sum the pulses having a time constant longer than the period between two successive embedded inductors but shorter than the period to the next successive inductor such that open-circuiting of any one of the plurality of embedded inductors effects termination of the relative motion between the two members.

* * * * *